United States Patent
Sawamura et al.

(10) Patent No.: US 12,410,344 B2
(45) Date of Patent: Sep. 9, 2025

(54) WATER-DISPERSED PRESSURE-SENSITIVE ADHESIVE COMPOSITION AND PRESSURE-SENSITIVE ADHESIVE SHEET

(71) Applicant: NITTO DENKO CORPORATION, Ibaraki (JP)

(72) Inventors: Amane Sawamura, Osaka (JP); Shuhei Yamamoto, Osaka (JP); Keisuke Shimokita, Osaka (JP); Hayata Matsumoto, Osaka (JP); Yasuhito Inai, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 575 days.

(21) Appl. No.: 17/865,857

(22) Filed: Jul. 15, 2022

(65) Prior Publication Data
US 2023/0048315 A1  Feb. 16, 2023

(30) Foreign Application Priority Data

Aug. 6, 2021 (JP) .................................. 2021-130285
Apr. 19, 2022 (JP) .................................. 2022-068622

(51) Int. Cl.
*C09J 7/38* (2018.01)
*C08K 5/01* (2006.01)
(Continued)

(52) U.S. Cl.
CPC .................. *C09J 7/385* (2018.01); *C08K 5/01* (2013.01); *C08K 5/41* (2013.01); *C08L 33/064* (2013.01);
(Continued)

(58) Field of Classification Search
None
See application file for complete search history.

(56) References Cited

U.S. PATENT DOCUMENTS

| | | | |
|---|---|---|---|
| 3,383,317 A | 5/1968 | Jacoby et al. | |
| 7,073,201 B2 * | 7/2006 | Sunada | C08F 36/18 524/835 |

(Continued)

FOREIGN PATENT DOCUMENTS

| | | |
|---|---|---|
| EP | 2 492 330 A2 | 8/2012 |
| EP | 3 878 877 A1 | 9/2021 |

(Continued)

OTHER PUBLICATIONS

Machine translation of JP 2009073920 A (Year: 2009).*
(Continued)

*Primary Examiner* — Frank D Ducheneaux
(74) *Attorney, Agent, or Firm* — Sughrue Mion, PLLC

(57) ABSTRACT

A water-dispersed pressure-sensitive adhesive composition of the present invention includes a water-dispersible polymer, a carboxylic acid copolymer thickener, a polyacrylic acid thickener, and water. A ratio of the carboxylic acid copolymer thickener in the solid content of the water-dispersed pressure-sensitive adhesive composition is 0.1% by mass or more and 1.5% by mass or less. A ratio of the polyacrylic acid thickener in the solid content of the adhesive composition is 1% by mass or more and 3.7% by mass or less. A pressure-sensitive adhesive sheet of the present invention has a pressure-sensitive adhesive layer formed from the water-dispersed pressure-sensitive adhesive composition.

20 Claims, 1 Drawing Sheet

(51) Int. Cl.

| | | |
|---|---|---|
| *C08K 5/41* | (2006.01) | |
| *C08L 33/06* | (2006.01) | |
| *C08L 33/08* | (2006.01) | |
| *C09J 7/10* | (2018.01) | |
| *C09J 11/08* | (2006.01) | |
| *C09J 133/06* | (2006.01) | |
| *C09J 133/08* | (2006.01) | |

(52) U.S. Cl.
CPC ................ *C08L 33/08* (2013.01); *C09J 7/10* (2018.01); *C09J 11/08* (2013.01); *C09J 133/064* (2013.01); *C09J 133/08* (2013.01); *C08L 2205/025* (2013.01); *C08L 2205/03* (2013.01); *C09J 2301/302* (2020.08); *C09J 2301/312* (2020.08); *C09J 2433/00* (2013.01)

(56) References Cited

U.S. PATENT DOCUMENTS

| | | | |
|---|---|---|---|
| 9,102,852 B2 * | 8/2015 | Shimokawa | ............ G02B 5/00 |
| 2003/0212195 A1 | 11/2003 | Matsumoto et al. | |
| 2009/0088516 A1 | 4/2009 | Li et al. | |
| 2013/0095298 A1 | 4/2013 | Shimokawa et al. | |
| 2018/0134888 A1 | 5/2018 | Ternorutsky et al. | |

FOREIGN PATENT DOCUMENTS

| | | | |
|---|---|---|---|
| JP | 2003-27027 | A | 1/2003 |
| JP | 2004-269699 | A | 9/2004 |
| JP | 2007-56248 | A | 3/2007 |
| JP | 2009073920 | A * | 4/2009 |
| JP | 2011-80074 | A | 4/2011 |
| JP | 2018-104485 | A | 7/2018 |
| JP | 2021-134274 | A | 9/2021 |
| WO | 2013/146939 | A1 | 10/2013 |
| WO | 2016/171093 | A1 | 10/2016 |

OTHER PUBLICATIONS

Extended European Search Report dated Dec. 23, 2022 in Application No. 22188760.7.

Extended European Search Report dated Dec. 23, 2022, issued in European Application No. 22186987.8.

Non-Final Office Action issued Apr. 30, 2025 in U.S. Appl. No. 17/865,844.

Communication issued May 9, 2025 in European Application No. 22188760.7.

* cited by examiner

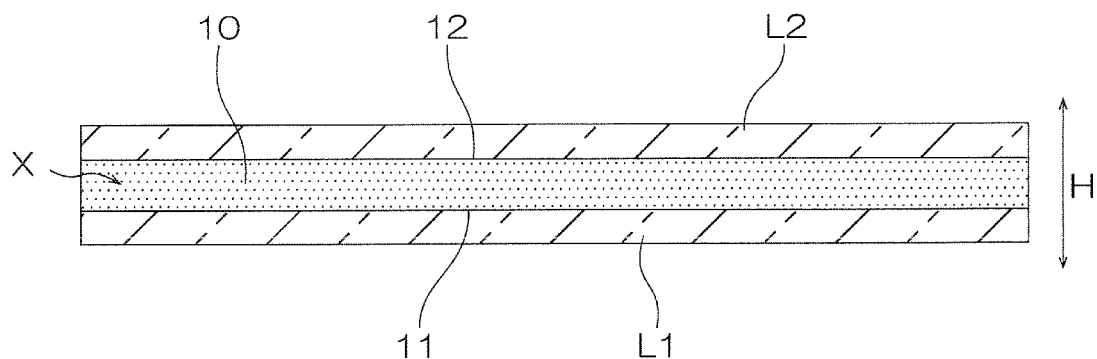

WATER-DISPERSED PRESSURE-SENSITIVE ADHESIVE COMPOSITION AND PRESSURE-SENSITIVE ADHESIVE SHEET

CROSS-REFERENCE TO RELATED APPLICATION

The present application claims priority from Japanese Patent Applications No. 2021-130285 filed on Aug. 6, 2021, and No. 2022-068622 filed on Apr. 19, 2022, the contents of which are hereby incorporated by reference into this application.

TECHNICAL FIELD

The present invention relates to a water-dispersed pressure-sensitive adhesive composition and a pressure-sensitive adhesive sheet.

BACKGROUND ART

Display panels have, for example, a lamination structure that includes elements such as a pixel panel, a polarizing film, a touch panel, and a cover film. In production processes of such display panels, for example, optically transparent pressure-sensitive adhesive sheets are used for bonding of elements included in the lamination structure. Then, as for pressure-sensitive adhesive sheets for display panel applications of personal devices such as mobile devices and wearable devices, the development of pressure-sensitive adhesive sheets formed from water-dispersed pressure-sensitive adhesive compositions is ongoing in order to avoid the influences of organic solvents on the human body in addition to the purpose of environmental countermeasures. A technique relating to the water-dispersed pressure-sensitive adhesive composition is described, for example, in Patent Document 1 below.

CITATION LIST

Patent Document

Patent Document 1: Japanese Unexamined Patent Publication No. 2021-134274

SUMMARY OF THE INVENTION

Problem to be Solved by the Invention

The above-described pressure-sensitive adhesive sheet is produced, for example, as follows. First, water as a solvent, a water-dispersible base polymer, and various components (water-dispersible tackifying resins, leveling agents, defoaming agents, thickeners, etc.) to be blended if necessary are mixed, thereby preparing a water-dispersed pressure-sensitive adhesive composition. Next, the water-dispersed pressure-sensitive adhesive composition is filtered with a filter (filtering step). Next, the water-dispersed pressure-sensitive adhesive composition is coated on a plastic substrate with a coater, thereby forming a coating film (coating step). Next, the coating film on the plastic substrate is dried, thereby forming a pressure-sensitive adhesive layer.

High cleanliness is required for the pressure-sensitive adhesive sheets for display panel applications. Therefore, in the above-described filtering step, a filter having a small pore size is used for removing fine foreign matters from the water-dispersed pressure-sensitive adhesive composition. From the viewpoint of the filter liquid permeability during such filtering, it is preferable that the water-dispersed pressure-sensitive adhesive composition has a lower viscosity.

On the other hand, in the above-described coating step, the water-dispersed pressure-sensitive adhesive composition is coated on a plastic substrate with a coater. On coating, a relatively large shearing force acts on the water-dispersed pressure-sensitive adhesive composition, and the viscosity of the composition is temporarily lowered. After being coated on the plastic substrate, the water-dispersed pressure-sensitive adhesive composition is released from the shearing force, and its viscosity recovers. However, when the viscosity of the water-dispersed pressure-sensitive adhesive composition immediately after the viscosity recovery is too low, the water-dispersed pressure-sensitive adhesive composition is repelled on the plastic substrate (occurrence of repellence). From the viewpoint of suppressing the repellence in the coating step, it is preferable that the water-dispersed pressure-sensitive adhesive composition immediately after the viscosity recovery has a higher viscosity. In addition, when the viscosity of the water-dispersed pressure-sensitive adhesive composition immediately after the viscosity recovery is too high, a coating mark remains in a streak shape in the coated water-dispersed pressure-sensitive adhesive composition. From the viewpoint of suppressing the coating mark, it is preferable that the water-dispersed pressure-sensitive adhesive composition immediately after the viscosity recovery has a viscosity of not too high.

Further, the pressure-sensitive adhesive sheet formed from the water-dispersed pressure-sensitive adhesive composition is required to have a pressure-sensitive adhesive force for ensuring connection reliability between adherends.

The present invention provides a water-dispersed pressure-sensitive adhesive composition suitable for ensuring a pressure-sensitive adhesive force, while achieving both low viscosity when filtered and appropriate viscosity recoverability in a coating step, and a pressure-sensitive adhesive sheet having a pressure-sensitive adhesive layer formed from the composition.

Means for Solving the Problem

The present invention [1] includes a water-dispersed pressure-sensitive adhesive composition including a water-dispersible polymer, a carboxylic acid copolymer thickener, a polyacrylic acid thickener, and water, wherein a ratio of the carboxylic acid copolymer thickener in a solid content of the water-dispersed pressure-sensitive adhesive composition is 0.1% by mass or more and 1.5% by mass or less, and a ratio of the polyacrylic acid thickener in the solid content is 1% by mass or more and 3.7% by mass or less.

The present invention [2] includes the water-dispersed pressure-sensitive adhesive composition described in the above-described [1], wherein a total ratio of the carboxylic acid copolymer thickener and the polyacrylic acid thickener in the solid content is 2% by mass or more and 4.2% by mass or less.

The present invention [3] includes the water-dispersed pressure-sensitive adhesive composition described in the above-described [1] or [2], wherein the water-dispersed pressure-sensitive adhesive composition has a viscosity of 0.8 Pa·s or less under conditions of a shear rate of $4 \text{ s}^{-1}$ and 30° C.

The present invention [4] includes the water-dispersed pressure-sensitive adhesive composition described in any one of the above-described [1] to [3], wherein the water-dispersed pressure-sensitive adhesive composition has a viscosity of 0.9 Pa·s or more and 1.5 Pa·s or less under conditions of a shear rate of 4 s$^{-1}$ and 30° C. after shearing under conditions of a shear rate of 1×10$^4$ s$^{-1}$ and 30° C.

The present invention [5] includes the water-dispersed pressure-sensitive adhesive composition described in any one of the above-described [1] to [4] further including a tackifier.

The present invention [6] includes the water-dispersed pressure-sensitive adhesive composition described in any one of the above-described [1] to [5] further including a leveling agent.

The present invention [7] includes a pressure-sensitive adhesive sheet including a pressure-sensitive adhesive layer formed from the pressure-sensitive adhesive composition described in any one of the above-described [1] to [6].

The present invention [8] includes the pressure-sensitive adhesive sheet described in the above-described [7], wherein the pressure-sensitive adhesive layer has a thickness of 40 µm or less.

Effect of the Invention

As described above, the water-dispersed pressure-sensitive adhesive composition of the present invention includes 0.1 to 1.5% by mass (ratio in the solid content) of a carboxylic acid copolymer thickener, and 1 to 3.7% by mass (ratio in the solid content) of a polyacrylic acid thickener in addition to the water-dispersible polymer and water. Such a water-dispersed pressure-sensitive adhesive composition is suitable for ensuring a pressure-sensitive adhesive force, while achieving both low viscosity when filtered and appropriate viscosity recoverability in a coating step.

BRIEF DESCRIPTION OF THE DRAWINGS

FIG. 1 shows a cross-sectional schematic view in one embodiment of a pressure-sensitive adhesive sheet of the present invention.

DESCRIPTION OF EMBODIMENTS

A water-dispersed pressure-sensitive adhesive composition which is one embodiment of the present invention is an aqueous emulsion including a water-dispersible polymer, a carboxylic acid copolymer thickener, a polyacrylic acid thickener, and water.

Examples of the water-dispersible polymer include water-dispersible acrylic polymers, water-dispersible urethane polymers, water-dispersible polyaniline polymers, and water-dispersible polyester polymers, and preferably, water-dispersible acrylic polymers are used. The acrylic polymer is a polymer of monomer components containing an alkyl (meth)acrylate at a ratio of 50% by mass or more. "(Meth)acrylic" means acrylic and/or methacrylic.

An example of the alkyl (meth)acrylate includes an alkyl (meth)acrylate having a linear-chain or branched alkyl group having 1 to 20 carbon atoms. Examples of the alkyl (meth)acrylate include methyl (meth)acrylate, ethyl (meth)acrylate, propyl (meth)acrylate, n-butyl (meth)acrylate, isopropyl (meth)acrylate, isobutyl (meth)acrylate, s-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, isotridecyl (meth)acrylate, tetradecyl (meth)acrylate, isotetradecyl (meth)acrylate, pentadecyl (meth)acrylate, hexadecyl (meth)acrylate, heptadecyl (meth)acrylate, octadecyl (meth)acrylate, isooctadecyl (meth)acrylate, nonadecyl (meth)acrylate, and eicosyl (meth)acrylate. These alkyl (meth)acrylates may be used alone or in combination of two or more. As the alkyl (meth)acrylate, preferably, alkyl acrylate having an alkyl group of 1 to 12 carbon atoms is used, more preferably, methyl acrylate and alkyl acrylate having an alkyl group of 2 to 8 carbon atoms are used, further more preferably, methyl acrylate and 2-ethylhexyl acrylate are used.

The ratio of the alkyl (meth)acrylate in the monomer components is preferably 70% by mass or more, more preferably 80% by mass or more, further more preferably 90% by mass or more, particularly preferably 95% by mass or more, and preferably 99.5% by mass or less, more preferably 99% by mass or less from the viewpoint of appropriately developing basic properties such as tackiness of a pressure-sensitive adhesive layer formed from the water-dispersed pressure-sensitive adhesive composition.

The monomer components may also include a copolymerizable monomer copolymerizable with alkyl (meth)alkylates. Examples of the copolymerizable monomer include polar group-containing monomers. Examples of the polar group-containing monomer include carboxy group-containing monomers, hydroxy group-containing monomers, monomers having a nitrogen atom-containing ring, silanol group-containing monomers, sulfo group-containing monomers, cyano group-containing monomers, and glycidyl group-containing monomers. The polar group-containing monomer serves to modify the acrylic polymer such as ensuring a cohesive force of the acrylic polymer. These copolymerizable monomers may be used alone or in combination of two or more.

Examples of the carboxy group-containing monomer include acrylic acid, methacrylic acid, 2-carboxyethyl (meth)acrylate, carboxypentyl (meth)acrylate, itaconic acid, maleic acid, fumaric acid, and crotonic acid. From the viewpoint of ensuring the tackiness of the pressure-sensitive adhesive layer formed from the water-dispersed pressure-sensitive adhesive composition, the monomer components preferably include a carboxy group-containing monomer, more preferably includes acrylic acid or methacrylic acid, and particularly preferably includes acrylic acid and methacrylic acid in combination.

The ratio of the carboxy group-containing monomer in the monomer components is preferably 0.5% by mass or more, more preferably 1% by mass or more, further more preferably 1.5% by mass or more from the viewpoint of ensuring the cohesive force of the pressure-sensitive adhesive layer formed from the water-dispersed pressure-sensitive adhesive composition. The ratio of the carboxy group-containing monomer in the monomer components is preferably 8% by mass or less, more preferably 5% by mass or less, further more preferably 3% by mass or less from the viewpoint of avoiding a corrosion risk of an adherend by acids.

Examples of the hydroxyl group-containing monomer include 2-hydroxyethyl (meth)acrylate, 2-hydroxypropyl (meth)acrylate, 2-hydroxybutyl (meth)acrylate, 3-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl) methyl(meth)acrylate.

Examples of the monomer having a nitrogen atom-containing ring include N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrolidone, N-(meth)acryloylpiperidine, N-(meth)acryloylpyrrolidine, N-vinylmorpholine, N-vinyl-3-morpholinone, N-vinyl-2-caprolactam, N-vinyl-1,3-oxazine-2-one, N-vinyl-3,5-morpholinedione, N-vinylpyrazole, N-vinylisooxazole, N-vinylthiazole, N-vinylisothiazole, and acryloylmorpholine.

Examples of the silanol group-containing monomer include 3-methacryloxypropyltrimethoxysilane, and 3-acryloxypropyltrimethoxysilane.

Examples of the sulfo group-containing monomer include styrene sulfonic acid, allyl sulfonic acid, sodium vinyl sulfonate, 2-(meth)acrylamide-2-methylpropane sulfonate, (meth)acrylamide propane sulfonic acid, sulfopropyl (meth) acrylate, and (meth)acryloyloxy naphthalene sulfonic acid.

An example of the phosphate group-containing monomer includes 2-hydroxyethylacryloyl phosphate.

Examples of the cyano group-containing monomer include acrylonitrile, and methacrylonitrile.

Examples of the glycidyl group-containing monomer include glycidyl (meth)acrylate, and 2-ethylglycidyl ether (meth)acrylate.

The water-dispersible acrylic polymer can be, for example, formed by emulsion polymerization of the above-described monomer components. In the emulsion polymerization, for example, first, a mixture containing monomer components, an emulsifier, and water is stirred, thereby preparing a monomer emulsion. Next, a polymerization initiator is added to the monomer emulsion, thereby initiating a polymerization reaction. In the polymerization reaction, a chain transfer agent may be used so as to adjust a molecular weight of the acrylic polymer. As a polymerization method, dropwise polymerization or collective polymerization may be used. The polymerization time is, for example, 0.5 to 10 hours. A polymerization temperature is, for example, 50° C. to 80° C.

Examples of the emulsifier include anionic emulsifiers, nonionic emulsifiers, and radically polymerizable emulsifiers (reactive emulsifiers).

Examples of the anionic emulsifier include sodium polyoxyethylene lauryl sulfate, sodium lauryl sulfate, ammonium lauryl sulfate, sodium dodecyl benzene sulfonate, sodium polyoxyethylene alkyl ether sulfate, ammonium polyoxyethylene alkyl phenyl ether sulfate, sodium polyoxyethylene alkyl phenyl ether sulfate, and sodium polyoxyethylene alkyl sulfosuccinate.

Examples of the nonionic emulsifier include polyoxyethylene alkyl ether, polyoxyethylene alkyl phenyl ether, polyoxyethylene fatty acid ester, and polyoxyethylene polyoxypropylene block polymer.

An example of the radically polymerizable emulsifier (reactive emulsifier) includes an emulsifier in which a radically polymerizable functional group is introduced into the above-described anionic emulsifier or the above-described nonionic emulsifier. Examples of the radically polymerizable functional group include vinyl groups, propenyl groups, isopropenyl groups, vinyl ether groups, and allyl ether groups. As the reactive emulsifier, specifically, ammonium-α-sulfonate-ω-1-(allyloxymethyl)alkyloxypolyoxyethylene is preferable. When the reactive emulsifier is used as an emulsifier, the water-dispersible acrylic polymer obtained by emulsion polymerization includes a monomer unit derived from the reactive emulsifier. That is, the emulsifier is incorporated into the acrylic polymer. Therefore, when the pressure-sensitive adhesive layer formed from the water-dispersed pressure-sensitive adhesive composition is attached to the adherend, it is possible to suppress contamination of the adherend by the emulsifier (low molecular weight component).

These emulsifiers may be used alone or in combination of two or more. A mixing amount of the emulsifier is, for example, 0.5 parts by mass or more, and for example, 5 parts by mass or less with respect to 100 parts by mass of the monomer components.

Examples of the polymerization initiator include azo polymerization initiators and peroxide polymerization initiators. Examples of the azo polymerization initiator include 2,2'-azobis {2[N-(2-carboxyethy)amidino]propane}, 2,2'-azobisisobutyronitrile, 2,2'-azobis(2-amidinopropane)dihydrochloride, 2,2'-azobis [2-(5-methyl-2-imidazoline-2-yl) propane] dihydrochloride, and 2,2'-azobis(N,N'-dimethyleneisobutylamidine). Examples of the peroxide polymerization initiator include benzoyl peroxide, t-butyl hydroperoxide, and hydrogen peroxide. These polymerization initiators may be used alone or in combination of two or more. The mixing amount of the polymerization initiator is, for example, 0.01 parts by mass or more, and for example, 2 parts by mass or less with respect to 100 parts by mass of the monomer components.

Examples of the chain transfer agent include glycidylmercaptan, mercaptoacetic acid, 2-mercaptoethanol, t-lauryl mercaptan, t-dodecanethiol, thioglycolic acid, 2-ethylhexyl thioglycolic acid, and 2,3-dimercapto-1-propanol. These chain transfer agents may be used alone or in combination of two or more. The mixing amount of the chain transfer agent is, for example, 0.001 parts by mass or more, and 0.5 parts by mass or less with respect to 100 parts by mass of the monomer components.

By such emulsion polymerization, the water-dispersible acrylic polymer is prepared as a polymer emulsion (aqueous dispersion liquid in which the water-dispersible acrylic polymer is dispersed in water).

The water-dispersible acrylic polymer has a weight average molecular weight (Mw) of, for example, 100000 or more, preferably 300000 or more, and for example, 5000000 or less, preferably 3000000 or less. The weight average molecular weight of the acrylic polymer is calculated in terms of polystyrene measured by gel permeation chromatography (GPC).

The water-dispersible polymer has a glass transition temperature (Tg) of, for example, 20° C. or less, preferably 0° C. or less.

The carboxylic acid copolymer thickener is an emulsion-type thickener composed of a carboxylic acid copolymer. The carboxylic acid copolymer is, for example, a copolymer of monomer components containing a carboxy group-containing acrylic monomer. Examples of a commercially available product of the carboxylic acid copolymer thickener include "ARON B-300K", "ARON B-500", "ARON A-7055, and "ARON A-7075" manufactured by TOAGOSEI CO., LTD., and preferably, "ARON B-500" is used. The viscosity of a 1% diluted solution of a commercially available product (aqueous solution product) of the carboxylic acid copolymer thickener, which is measured with a BM-type viscometer under the conditions of 25° C., a pH of 8 to 9, and 60 rpm, is preferably 10000 mPa·s or less, more preferably 1200 mPa·s or less, and preferably 10 mPa·s or more, more preferably 1000 mPa·s or more. These carboxylic acid copolymer thickeners may be used alone or in combination of two or more.

The ratio of the carboxylic acid copolymer thickener in the solid content of the water-dispersed pressure-sensitive adhesive composition is 0.1% by mass or more, preferably 0.3% by mass or more, more preferably 0.4% by mass or more, further more preferably 0.5% by mass or more from the viewpoint of ensuring thickening by the carboxylic acid copolymer thickener in the water-dispersed pressure-sensitive adhesive composition. The ratio of the carboxylic acid copolymer thickener in the solid content of the water-dispersed pressure-sensitive adhesive composition is 1.5% by mass or less, preferably 1.3% by mass or less, more preferably 1.1% by mass or less, further more preferably 0.9% by mass or less from the viewpoint of avoiding excessive thickening by the carboxylic acid copolymer thickener in the water-dispersed pressure-sensitive adhesive composition. The solid content of the water-dispersed pressure-sensitive adhesive composition is a component other than water in the water-dispersed pressure-sensitive adhesive composition, and specifically, a combination of the water-dispersible polymer, the carboxylic acid copolymer thickener, the polyacrylic acid thickener, and another component (leveling agent, tackifier, etc.) to be blended if necessary.

Examples of the polyacrylic acid thickener include polyacrylic acid (homopolymer of acrylic acid), sodium polyacrylate, and ammonium polyacrylate. Examples of a commercially available product of the polyacrylic acid thickener include "ARON A-10H" (polyacrylic acid), "ARON A-20L" (sodium polyacrylate), "ARON A-7100" (sodium polyacrylate), "ARON A-30" (ammonium polyacrylate), and "ARON A-7195" (ammonium polyacrylate) manufactured by TOAGOSEI CO., LTD., and preferably, "ARON A-10H" is used. The viscosity at 25° C. of the commercially available product of the polyacrylic acid thickener (aqueous solution product) is preferably 50000 mPa·s or less, more preferably 40000 mPa·s or less, and preferably 1000 mPa·s or more, preferably 5000 mPa·s or more. These polyacrylic acid thickeners may be used alone or in combination of two or more. The polyacrylic acid thickener exhibiting such viscosity has a molecular weight of preferably one million or less, more preferably 0.6 million or less, and preferably 50000 or more, more preferably 0.1 million or more.

The ratio of the polyacrylic acid thickener in the solid content of the water-dispersed pressure-sensitive adhesive composition is 1% by mass or more, preferably 1.4% by mass or more, more preferably 1.8% by mass or more, further more preferably 2% by mass or more from the viewpoint of ensuring thickening by the polyacrylic acid thickener in the water-dispersed pressure-sensitive adhesive composition. The ratio of the polyacrylic acid thickener in the solid content of the water-dispersed pressure-sensitive adhesive composition is 3.7% by mass or less, preferably 3% by mass or less, more preferably 2.8% by mass or less, further more preferably 2.6% by mass or less from the viewpoint of avoiding excessive thickening by the polyacrylic acid thickener in the water-dispersed pressure-sensitive adhesive composition.

The total ratio of the carboxylic acid copolymer thickener and the polyacrylic acid thickener in the solid content of the water-dispersed pressure-sensitive adhesive composition is preferably 2% by mass or more, more preferably 2.5% by mass or more, further more preferably 2.7% by mass or more, and preferably 4.2% by mass or less, more preferably 3.5% by mass or less, further more preferably 2.9% by mass or less from the viewpoint of balance between the first viscosity $\eta_1$ and the second viscosity $\eta_2$ described later.

The water-dispersed pressure-sensitive adhesive composition may contain another component. Examples of the other component include leveling agents, tackifiers, silane coupling agents, preservatives, surfactants, cross-linking agents, and antistatic agents.

Examples of the leveling agent include "NEOCOL SW-C" (sodium dialkylsulfosuccinate, manufactured by DKS Co., Ltd.), "NEOCOL P" (sodium dialkylsulfosuccinate, manufactured by DKS Co., Ltd.), "SURFINOL 420" (acetylene glycol ethylene oxide surfactant, manufactured by Nissin Chemical co., ltd.), and "PELEX OT-P" (sodium dialkylsulfosuccinate, manufactured by Kao Corporation). Further, examples of the leveling agent include "NOPCO WET 50" (sulfonic acid-based anionic surfactant), "SN WET 126" (modified silicone/special polyether-based surfactant), "SN WET FST2" (nonionic wetting agent of polyoxyalkyleneamine), "SN WET S" (nonionic wetting agent of polyoxyalkyleneamine ether), and "SN WET 125" (modified silicone-based surfactant) (all manufactured by SAN NOPCO LIMITED). These leveling agents may be used alone or in combination of two or more. From the viewpoint of ensuring excellent leveling properties of the water-dispersed pressure-sensitive adhesive composition, the leveling agent is preferably at least one selected from "NEOCOL SW-C", "NEOCOL P", and "PELEX OT-P".

The mixing amount of the leveling agent is preferably 0.1 parts by mass or more, more preferably 0.5 parts by mass or more, further more preferably 0.8 parts by mass or more with respect to 100 parts by mass of the water-dispersible polymer from the viewpoint of suppressing repellence of the water-dispersed pressure-sensitive adhesive composition. The mixing amount of the leveling agent is preferably 3 parts by mass or less, more preferably 2 parts by mass or less, further more preferably 1 part by mass or less from the viewpoint of ensuring the tackiness of the water-dispersed pressure-sensitive adhesive composition.

Examples of the tackifier include tackifier resins such as rosin resins, rosin derivative resins, petroleum resins, terpene resins, phenol resins, and ketone resins. The mixing amount of the tackifier is preferably 5 parts by mass or more, more preferably 15 parts by mass or more, further more preferably 20 parts by mass or more, particularly preferably 25 parts by mass or more, and preferably 50 parts by mass or less, more preferably 45 parts by mass or less, further more preferably 40 parts by mass or less with respect to 100 parts by mass of the water-dispersible polymer from the viewpoint of balance between the viscosity of the water-dispersed pressure-sensitive adhesive composition and the tackiness of the pressure-sensitive adhesive layer formed from the composition.

Examples of the silane coupling agent include 3-methacryloxypropyltrimethoxysilane, 3-methacryloxypropylmethyldimethoxysilane, 3-methacryloxypropylmethyldiethoxysilane, and 3-methacryloxypropyltriethoxysilane, and preferably, 3-methacryloxypropyltrimethoxysilane is used. The mixing amount of the silane coupling agent is, for example, 0.005 parts by mass or more, and for example, 1 part by mass or less with respect to 100 parts by mass of the water-dispersible polymer.

The water-dispersed pressure-sensitive adhesive composition contains no organic solvent. Such a water-dispersed pressure-sensitive adhesive composition is preferable from the viewpoint of reducing environmental load.

The water-dispersed pressure-sensitive adhesive composition can be prepared, for example, by adding various components to an emulsion polymerization liquid of the water-dispersible polymer. In addition, the water content of the water-dispersed pressure-sensitive adhesive composition is increased or decreased, thereby adjusting the solid content concentration.

The solid content concentration of the water-dispersed pressure-sensitive adhesive composition is preferably 10% by mass or more, more preferably 15% by mass or more, further more preferably 20% by mass or more, particularly preferably 25% by mass or more, and preferably 50% by mass or less, more preferably 40% by mass or less, further more preferably 35% by mass or less, even more preferably 30% by mass or less, particularly preferably 27% by mass or less from viewpoint of balance between the first viscosity $\eta_1$ and the second viscosity $\eta_2$ described later.

The viscosity (the first viscosity $\eta_1$) of the water-dispersed pressure-sensitive adhesive composition under the conditions of a shear rate of 4 s$^{-1}$ at 30° C. is preferably 0.8 Pa·s or less, more preferably 0.7 Pa·s or less, further more preferably 0.6 Pa·s or less from the viewpoint of ensuring filter permeability during a filtering step described later. The first viscosity $\eta_1$ is preferably 0.1 Pa·s or more, more preferably 0.3 Pa·s or more, further more preferably 0.5 Pa·s or more from the viewpoint of suppressing repellence on being coated onto a substrate after filter passing. A method for measuring the first viscosity $\eta_1$ is described in Examples later.

The viscosity (the second viscosity $\eta_2$) of the water-dispersed pressure-sensitive adhesive composition under the conditions of a shear rate of 4 s$^{-1}$ and 30° C. after shearing under the conditions of a shear rate of 1×10$^4$ s$^{-1}$ and 30° C. is preferably 0.9 Pa·s or more, more preferably 1.0 Pa·s or more from the viewpoint of suppressing repellence and streaks in the coating step described later. The second viscosity $\eta_1$ is preferably 1.5 Pa·s or less, more preferably 1.3 Pa·s or less, further more preferably 1.2 Pa·s or less from the viewpoint of suppressing streak marks in the coating step. The method for measuring the second viscosity $\eta_2$ is described in Examples later.

From the viewpoint of balance between ensuring the filter permeability in the filtering step and suppressing repellence and streaks in the coating step, the ratio ($\eta_1/\eta_1$) of the second viscosity $\eta_1$ to the first viscosity $\eta_1$ is preferably 1.6 or more, more preferably 1.7 or more, and preferably 3 or less, more preferably 2.5 or less, further more preferably below 2, particularly preferably 1.9 or less.

As described above, the water-dispersed pressure-sensitive adhesive composition includes 0.1 to 1.5% by mass (ratio in the solid content) of the carboxylic acid copolymer thickener and 1 to 3.7% by mass of the polyacrylic acid thickener in addition to the water-dispersible polymer and water. Such a water-dispersed pressure-sensitive adhesive composition is suitable for ensuring the pressure-sensitive adhesive force, while achieving both low viscosity when filtered and appropriate viscosity recoverability in the coating step. The details are shown in Examples and Comparative Examples described below.

FIG. 1 shows a cross-sectional schematic view of a pressure-sensitive adhesive sheet X as one embodiment of the present invention. The pressure-sensitive adhesive sheet X has a pressure-sensitive adhesive layer 10. The pressure-sensitive adhesive layer 10 has a sheet shape having a predetermined thickness. The pressure-sensitive adhesive layer 10 extends in a direction (plane direction) perpendicular to a thickness direction. The pressure-sensitive adhesive layer 10 has a pressure-sensitive adhesive surface 11 and a pressure-sensitive adhesive surface 12 at the opposite side to the pressure-sensitive adhesive surface 11. FIG. 1 illustratively shows a state in which release liners L1 and L2 are attached to pressure-sensitive adhesive surfaces 11 and 12 of the pressure-sensitive adhesive layer 10. The release liner L1 is disposed on the pressure-sensitive adhesive surface 11. The release liner L2 is disposed on the pressure-sensitive adhesive surface 12. Further, the pressure-sensitive adhesive sheet X is, for example, an optical pressure-sensitive adhesive sheet disposed at a light passage site in a display panel. Examples of the display panel include display panels of personal devices such as mobile devices and wearable devices. The display panel has, for example, a lamination structure including elements such as a pixel panel, a polarizing film, a touch panel, and a cover glass. The pressure-sensitive adhesive sheet X is, for example, used for bonding of elements included in the lamination structure in production processes of display panels.

The pressure-sensitive adhesive layer 10 is a pressure-sensitive adhesive layer formed from the above-described water-dispersed pressure-sensitive adhesive composition. A thickness of the pressure-sensitive adhesive layer 10 is preferably 50 μm or less, more preferably 40 μm or less, further more preferably 30 μm or less, particularly preferably 20 μm or less from the viewpoint of handleability and processability. The thickness of the pressure-sensitive adhesive layer 10 is preferably 3 μm or more, more preferably 5 μm or more, further more preferably 10 μm or more from the viewpoint of ensuring sufficient adhesiveness to the adherend.

The release liners L1 and L2 are elements for covering and protecting the pressure-sensitive adhesive sheet X (the pressure-sensitive adhesive layer 10), and removed from the pressure-sensitive adhesive sheet X to use the pressure-sensitive adhesive sheet X. The release liner L1 is, for example, a plastic film having flexibility. Examples of the plastic film include polyethylene terephthalate films, polyethylene films, polypropylene films, and polyester films. The thickness of the release liners L1 and L2 is, for example, 3 μm or more, and for example, 200 μm or less. The release liners L1 and L2 are preferably surface-treated for releasing.

The pressure-sensitive adhesive sheet X can be, for example, produced as follows.

First, the above-described water-dispersed pressure-sensitive adhesive composition is filtered with a filter (filtering step). Examples of an opening size of the filter for filtration include 188 μm, 154 μm, 109 μm, 75 μm, 50 μm, 25 μm, 10 μm, 5 μm, 3 μm, 2 μm, and 1 μm.

Next, the above-described water-dispersed pressure-sensitive adhesive composition is coated on the release liner L1 with a coater, thereby forming a coating film (coating film forming step). Examples of a coating method include roll coating, kiss roll coating, gravure coating, reverse coating, roll brushing, spray coating, dip roll coating, bar coating, knife coating, air knife coating, curtain coating, lip coating, and die coating. In this step, a coater in accordance with the coating method is used.

Next, the coating film on the release liner L1 is dried, thereby forming the pressure-sensitive adhesive layer 10 (drying step). A drying temperature is, for example, from room temperature to 140° C. The drying time is, for example, 1 to 10 minutes.

Next, if necessary, the release liner L2 is attached to the exposed surface of the pressure-sensitive adhesive layer 10 on the release liner L1.

As described above, the pressure-sensitive adhesive sheet X can be produced from the water-dispersed pressure-sensitive adhesive composition.

As described above, the water-dispersed pressure-sensitive adhesive composition includes 0.1 to 1.5% by mass (ratio in the solid content) of the carboxylic acid copolymer thickener and 1 to 3.7% by mass (ratio in the solid content) of the polyacrylic acid thickener in addition to the water-dispersible polymer and water. Such a water-dispersed pressure-sensitive adhesive composition is suitable for ensuring the pressure-sensitive adhesive force of the pressure-sensitive adhesive sheet X, while achieving both low viscosity for the filtering step and appropriate viscosity recoverability in the coating step.

In the filtering step, the lower the viscosity of the water-dispersed pressure-sensitive adhesive composition, the easier it is for the water-dispersed pressure-sensitive adhesive composition to pass through the filter, and it is possible to shorten the time required for the filtering step.

On coating of the water-dispersed pressure-sensitive adhesive composition with the coater in the coating step, a relatively large shearing force acts on the water-dispersed pressure-sensitive adhesive composition, and the viscosity of the composition is temporarily lowered. After being coated on the plastic substrate (release liner), the water-dispersed pressure-sensitive adhesive composition is released from the shearing force, and its viscosity recovers. When the viscosity of the water-dispersed pressure-sensitive adhesive composition immediately after the viscosity recovery is too low, the water-dispersed pressure-sensitive adhesive composition is repelled on the plastic substrate (occurrence of repellence). When the viscosity immediately after the viscosity recovery is too high, streaks occur in the coating film of the water-dispersed pressure-sensitive adhesive composition (occurrence of streaks). However, since the above-described water-dispersed pressure-sensitive adhesive composition has appropriate viscosity recoverability after coating, the occurrence of repellence and streaks is suppressed.

EXAMPLES

Next, the present invention is further described based on Examples below. The present invention is however not limited by Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Example 1 Preparation of Water-Dispersible Polymer

A mixture containing 30 parts by mass of ion-exchanged water, 85 parts by mass of 2-ethylhexyl acrylate, 13 parts by mass of methyl acrylate, 1.25 parts by mass of acrylic acid, 0.75 parts by mass of methacrylic acid, 0.035 parts by mass of t-lauryl mercaptan as a chain transfer agent, 1.88 parts by mass of a reactive emulsifier (trade name "AQUARON KH-1025", ammonium-α-sulfonato-ω-1-(allyloxymethyl)alkyloxypolyoxyethylene, manufactured by DKS Co., Ltd.), and 0.02 parts by mass of a silane coupling agent (trade name "KBM-503", 3-methacryloxypropyltrimethoxysilane, manufactured by Shin-Etsu Chemical Co., Ltd.) was stirred in a vessel with a homomixer, thereby preparing a monomer emulsion.

On the other hand, in a reaction vessel equipped with a reflux condenser tube, a nitrogen introduction tube, a thermometer, and a stirrer, a mixture containing 73 parts by mass of ion-exchanged water and 0.07 parts by mass of a reactive emulsifier (AQUARON KH-1025) was stirred at 60° C. for one hour under a nitrogen atmosphere. Next, 0.1 parts by mass of 2,2'-azobis {2-[N-(2-carboxyethyl)amidino]propane} tetrahydrate as a polymerization initiator was added to the obtained mixture, and then, the above-described monomer emulsion was added dropwise to the mixture over four hours to proceed the emulsion polymerization reaction. Next, the reaction liquid was held at 60° C. for three hours (aging). Next, the solution thus obtained was cooled to room temperature, and then, the pH of the solution was adjusted to 6.0 by adding a 10% by mass ammonia aqueous solution. Next, 0.03 parts by mass of a preservative (trade name "Levanax BX-150", manufactured by SHOEI CHEMICAL CO., LTD.) was added to the solution. As described above, an acrylic polymer emulsion containing a water-dispersible acrylic polymer as a water-dispersible polymer was prepared.

Preparation of Water-Dispersed Pressure-Sensitive Adhesive Composition

With respect to 100 parts by mass of the water-dispersible acrylic polymer, 1.00 parts by mass (solid content conversion value) of a carboxylic acid copolymer thickener (trade name "ARON B-500" manufactured by TOAGOSEI CO., LTD.), 3.15 parts by mass (solid content conversion value) of a polyacrylic acid thickener (trade name "ARON A-10H", polyacrylic acid, weight average molecular weight of 0.2 million, manufactured by TOAGOSEI CO., LTD.), 35 parts by mass (solid content conversion value) of a tackifier (trade name "TAMANOL E-200NT", terpene resin, manufactured by Arakawa Chemical Industries, Ltd.), and 0.89 parts by mass (solid content conversion value) of a leveling agent (trade name "NEOCOL SW-C", sodium dialkylsulfosuccinate, manufactured by DKS Co., Ltd.) were added to the acrylic polymer emulsion to be mixed. Next, the mixture was adjusted to the solid content concentration of 25.5% by mass by addition of ion-exchanged water, and then, adjusted to the pH to 9.0 by addition of 10% by mass ammonia aqueous solution. As described above, the water-dispersed pressure-sensitive adhesive composition (solid content concentration of 25.5% by mass) of Example 1 was prepared (in Tables 1 and 2, the unit of each numerical value representing the composition is "parts by mass"). The prepared water-dispersed pressure-sensitive adhesive composition was filtered through a nylon mesh filter (trade name "N/SHAR 4300KK", thickness of 110 μm, 80 meshes, opening size of 188 μm, manufactured by KOYO GOSEN KAKO CO., LTD.).

Fabrication of Pressure-Sensitive Adhesive Sheet

First, a water-dispersed pressure-sensitive adhesive composition was coated on a release treatment surface of a polyethylene terephthalate (PET) film (trade name "DIAFOIL MRF38", manufactured by Mitsubishi Chemical Holdings Corporation) which was subjected to silicone release treatment, thereby forming a coating film. Next, the coating film on the PET film was dried in an oven for three minutes, thereby forming a pressure-sensitive adhesive layer having a thickness of 10 μm. The drying temperature was set at 100° C. As described above, the pressure-sensitive adhesive sheet (pressure-sensitive adhesive sheet having a PET film) of Example 1 was fabricated.

Examples 2 to 8 and Comparative Examples 1 to 10

Each of the water-dispersed pressure-sensitive adhesive compositions of Examples 2 to 8 and Comparative Examples 1 to 10 was fabricated in the same manner as in the water-dispersed pressure-sensitive adhesive composition of Example 1, except that each mixing amount of the carboxylic acid copolymer thickener and the polyacrylic acid thickener was changed as shown in Tables 1 and 2. In Comparative Examples 1 and 3, the carboxylic acid copolymer thickener was not used. In Comparative Examples 8 to 10, the polyacrylic acid thickener was not used.

Each of the pressure-sensitive adhesive sheets (pressure-sensitive adhesive sheets having a PET film) of Examples 1 to 8 and Comparative Examples 3 to 5, 7, and 9 was fabricated in the same manner as in the pressure-sensitive adhesive sheet of Example 1, except that each mixing amount of the carboxylic acid copolymer thickener and the polyacrylic acid thickener was changed as shown in Tables 1 and 2.

The work for fabricating each of the pressure-sensitive adhesive sheets of Comparative Examples 1, 2, 6, 8, and 10 was processed in the same manner as in the work for fabricating the pressure-sensitive adhesive sheet of Example 1, except that each mixing amount of the carboxylic acid copolymer thickener and the polyacrylic acid thickener was changed as shown in Table 2. However, repellence occurred in the water-dispersed pressure-sensitive adhesive composition coated on the PET film, and the pressure-sensitive adhesive sheets of Comparative Examples 1, 2, 6, 8, and 10 could not be fabricated.

Measurement of Viscosity

The viscosity of each of the water-dispersed pressure-sensitive adhesive compositions of Examples 1 to 8 and Comparative Examples 1 to 10 was measured. Specifically, the details are as follows.

First, the viscosity of the water-dispersed pressure-sensitive adhesive composition was measured with a rheometer viscometer (trade name "RheoStress1", manufactured by HAAKE) under the conditions of a shear rate of 4 $s^{-1}$ and 30° C. (first viscosity measurement). In this measurement, a cone-type rotor (cone No. 222 to 1267, cone size of 35 mm, cone angle of 0.5 degrees) was used as a rotor to apply shearing to the water-dispersed pressure-sensitive adhesive composition (the same applies to the second viscosity measurement described later). The measured viscosity is shown in Tables 1 and 2 as the first viscosity $\eta_{11}$ (Pa·s).

Subsequently, the shear rate was increased to $1 \times 10^4$ $s^{-1}$ and the shearing was applied to the water-dispersed pressure-sensitive adhesive composition under the conditions of a shear rate of $1 \times 10^4$ $s^{-1}$ and 30° C. for 10 seconds. Subsequently, the shear rate was lowered to 4 $s^{-1}$ and in three minutes after lowering, the viscosity of the water-dispersed pressure-sensitive adhesive composition was measured under the conditions of a shear rate of 4 $s^{-1}$ and 30° C. with a rheometer viscometer (RheoStress1) (second viscosity measurement). The measured viscosity is shown in Tables 1 and 2 as the second viscosity $\eta_2$ (Pa·s). A ratio ($\eta_2/\eta_1$) of the second viscosity $\eta_2$ to the first viscosity $\eta_1$ is also shown in Tables 1 and 2.

Filter Permeability

The filter permeability of each of the water-dispersed pressure-sensitive adhesive compositions of Examples 1 to 8 and Comparative Examples 1 to 10 was examined. Specifically, a 1-mL water-dispersed pressure-sensitive adhesive composition was quietly supplied (disposed) on a horizontally disposed nylon mesh filter (trade name "N/SHAR 4300KK", thickness of 110 μm, 80 meshes, opening size of 188 μm, manufactured by KOYO GOSEN KAKO CO., LTD.) with a dropper, and it was observed whether the composition permeated through the filter by its own weight. As for the filter permeability of the water-dispersed pressure-sensitive adhesive composition, a case where the water-dispersed pressure-sensitive adhesive composition permeated through the filter within three seconds by its own weight was evaluated as "Excellent" and a case where the water-dispersed pressure-sensitive adhesive composition did not permeate within three seconds was evaluated as "Defective". The results are shown in Tables 1 and 2.

Wettability

As for each of the water-dispersed pressure-sensitive adhesive compositions of Examples 1 to 8 and Comparative Examples 1 to 10, the wettability with respect to a plastic substrate was examined. Specifically, the details are as follows.

First, a water-dispersed pressure-sensitive adhesive composition was coated on a release treatment surface of a polyethylene terephthalate (PET) film (trade name "DIAFOIL MRF38", manufactured by Mitsubishi Chemical Holdings Corporation) which was subjected to silicone release treatment, thereby forming a coating film having a thickness of about 40 μm. Next, the coating film was visually observed. Then, as for the repellency (suppression of repellence) of the water-dispersed pressure-sensitive adhesive composition, a case where no repellence occurred in the coating film (water-dispersed pressure-sensitive adhesive composition) on the PET substrate was evaluated as "Excellent", and a case where repellence occurred was evaluated as "Defective". In addition, as for the difficulty of forming streaks (suppression of streaks) in the water-dispersed pressure-sensitive adhesive composition, a case where streaks did not occur in the coating film (water-dispersed pressure-sensitive adhesive composition) on the PET substrate was evaluated as "Excellent", and a case where streaks occurred was evaluated as "Defective". The evaluation results are shown in Tables 1 and 2. The repellency and the difficulty of forming streaks of the water-dispersed pressure-sensitive adhesive composition serve as an indicator of the wettability of the water-dispersed pressure-sensitive adhesive composition. As for the water-dispersed pressure-sensitive adhesive compositions of Comparative Examples 1, 2, 6, 8, and 10, since the repellence occurred after coating onto the PET film, and the coating film was not appropriately formed, the appearance of the streaks in the coating film could not be confirmed.

Drop Impact Resistance Test

As for each of the pressure-sensitive adhesive sheets in Examples 1 to 8 and Comparative Examples 3 to 5, 7, and 9, the pressure-sensitive adhesive force was examined by a drop impact resistance test. Specifically, the details are as follows.

First, a piece of pressure-sensitive adhesive sheet having a PET film in a rectangular frame shape (outer diameter of 24.5 mm×24.5 mm, width of 2 mm) was obtained by punching process with respect to the pressure-sensitive adhesive sheet having a PET film. Next, the piece of pressure-sensitive adhesive sheet having a PET film was attached along the four sides of a square first stainless steel plate (25 mm×825 mm, thickness of 3 mm). Then, the PET film was peeled off from the piece of pressure-sensitive adhesive sheet on the first stainless steel plate. Next, the first stainless steel plate was compressively bonded to a square second stainless steel plate (50 mm×850 mm, thickness of 2 mm) having an opening portion (20 mm×820 mm) in the center under the conditions of a compressive bonding force of 62 N and the compressive bonding time of 10 seconds, while central positions of both plates were aligned when viewed from the top. Thus, a bonded product was obtained. Next, the bonded product was left to stand at 80° C. for 30 minutes. Next, the bonded product was cooled to 23° C.

Next, a cylindrical cradle (height of 50 mm, outer diameter of 49 mm, inner diameter of 43 mm) was placed on a stage of a DuPont impact tester (manufactured by Toyo Seiki Seisaku-sho, Ltd.), and thereafter, the above-described bonded product was placed on the cradle. Specifically, the bonded product was disposed on the cradle so that the second stainless steel plate in the bonded product was disposed on the upper side, the lower surface of the second stainless steel plate was in contact with the upper end of the cradle, and the lower-side first stainless steel plate was disposed in the cylindrical cavity of the cradle (the first stainless steel plate was exposed upwardly through the opening portion of the second stainless steel plate). Then, a stainless steel-made cylindrical die (bottom diameter of 6.2 mm) was placed on the first stainless steel plate facing the opening portion of the second stainless steel plate in the bonded product.

Then, a drop impact resistance test in which a weight was dropped in a vertical direction with respect to the die on the bonded product was carried out with the DuPont impact tester. In the test for each bonded product, the weight was dropped multiple times until peeling occurred between the first and second stainless steel plates of the bonded product by changing the mass of the weight (50 g, 100 g) and the dropping height so that the energy of the impact acting on the bonded product through the die increased step by step. In the use of the weight having a mass of 50 g, the dropping height of the weight was changed from 50 to 500 mm by 50 mm Thereafter, in the use of the weight having a mass of 100 g, the dropping height of the weight was changed from 300 to 50 mm by 50 mm. A cumulative value of position energy [load (kg)×gravity acceleration of 9.8 (m/s$^2$)×height (m)] of the weight until the occurrence of peeing between the first and second stainless steel plates of the bonded product was referred to as drop impact resistance energy (J).

An average value of the drop impact resistance energy obtained from three trials (n=3) of the above-described drop impact resistance test is shown in Tables 1 and 2 as drop impact resistance energy (J). Further, as for the drop impact resistance of the pressure-sensitive adhesive sheet, a case where the drop impact resistance energy was 0.4 J or more was evaluated as "Excellent", and a case where the drop impact resistance energy was below 0.4 J was evaluated as "Defective. The results are shown in Tables 1 and 2.

TABLE 1

|  | Ex. 1 | Ex. 2 | Ex. 3 | Ex. 4 | Ex. 5 | Ex. 6 | Ex. 7 | Ex. 8 | Comparative Ex. 1 |
|---|---|---|---|---|---|---|---|---|---|
| Water-Dispersible Polymer | 100 | 100 | 100 | 100 | 100 | 100 | 100 | 100 | 100 |
| Carboxylic Acid Copolymer Thickener (% by mass in Solid Content) | 1.00 (0.71%) | 0.50 (0.36%) | 1.00 (0.71%) | 1.50 (1.08%) | 0.15 (0.11%) | 2.00 (1.43%) | 1.80 (1.29%) | 0.60 (0.42%) | — |
| Polyacrylic Acid Thickener (% by mass in Solid Content) | 3.15 (2.25%) | 3.15 (2.26%) | 4.00 (2.84%) | 2.00 (1.43%) | 5.00 (3.55%) | 1.80 (1.29%) | 1.50 (1.08%) | 4.90 (3.47%) | 3.15 (2.27%) |
| Total Amount of Thickener (% by mass in Solid Content) | 4.15 (2.96%) | 3.65 (2.62%) | 5.00 (3.55%) | 3.50 (2.51%) | 5.15 (3.65%) | 3.80 (2.72%) | 3.30 (2.37%) | 5.50 (3.89%) | 3.15 (2.27%) |
| Tackifier | 35 | 35 | 35 | 35 | 35 | 35 | 35 | 35 | 35 |
| Leveling Agent | 0.89 | 0.89 | 0.89 | 0.89 | 0.89 | 0.89 | 0.89 | 0.89 | 0.89 |
| Solid Content Concentration (% by mass) | 25.50 | 25.50 | 25.50 | 25.50 | 25.50 | 25.50 | 25.50 | 25.50 | 25.50 |
| First Viscosity $\eta_1$ (Pa · s) | 0.6 | 0.4 | 0.7 | 0.5 | 0.6 | 0.8 | 0.8 | 0.6 | 0.3 |
| Second Viscosity $\eta_2$ (Pa · s) | 1.0 | 0.9 | 1.1 | 0.9 | 1.3 | 1.0 | 1.0 | 1.2 | 0.6 |
| $\eta_2/\eta_1$ | 1.7 | 2.3 | 1.6 | 1.8 | 2.2 | 1.3 | 1.3 | 2.0 | 2.0 |
| Filter Permeability | Excellent | Excellent | Excellent | Excellent | Excellent | Excellent | Excellent | Excellent | Excellent |
| Suppression of Repellence | Excellent | Excellent | Excellent | Excellent | Excellent | Excellent | Excellent | Excellent | Defective |
| Suppression of Streaks | Excellent | Excellent | Excellent | Excellent | Excellent | Excellent | Excellent | Excellent | — |
| Drop Impact Resistance Energy (J) | 0.79 | 0.80 | 0.92 | 0.47 | 0.90 | 0.48 | 0.54 | 0.80 | — |
| Drop Impact Resistance | Excellent | Excellent | Excellent | Excellent | Excellent | Excellent | Excellent | Excellent | — |

TABLE 2

|  | Comparative Ex. 2 | Comparative Ex. 3 | Comparative Ex. 4 | Comparative Ex. 5 | Comparative Ex. 6 | Comparative Ex. 7 | Comparative Ex. 8 | Comparative Ex. 9 | Comparative Ex. 10 |
|---|---|---|---|---|---|---|---|---|---|
| Water-Dispersible Polymer | 100 | 100 | 100 | 100 | 100 | 100 | 100 | 100 | 100 |
| Carboxylic Acid Copolymer Thickener (% by mass in Solid Content) | 0.05 (0.04%) | — | 2.50 (1.77%) | 3.00 (2.11%) | 1.00 (0.73%) | 1.00 (0.70%) | 2.50 (1.81%) | 4.00 (2.86%) | 3.50 (2.51%) |
| Polyacrylic Acid Thickener (% by mass in Solid Content) | 3.15 (2.26%) | 6.00 (4.23%) | 3.15 (2.23%) | 3.15 (2.22%) | 1.00 (0.73%) | 5.50 (3.86%) | — | — | — |
| Total Amount of Thickener (% by mass in Solid Content) | 3.20 (2.30%) | 6.00 (4.23%) | 5.65 (3.99%) | 6.15 (4.33%) | 2.00 (1.45%) | 6.50 (4.56%) | 2.50 (1.81%) | 4.00 (2.86%) | 3.50 (2.51%) |

TABLE 2-continued

|  | Comparative Ex. 2 | Comparative Ex. 3 | Comparative Ex. 4 | Comparative Ex. 5 | Comparative Ex. 6 | Comparative Ex. 7 | Comparative Ex. 8 | Comparative Ex. 9 | Comparative Ex. 10 |
|---|---|---|---|---|---|---|---|---|---|
| Tackifier | 35 | 35 | 35 | 35 | 35 | 35 | 35 | 35 | 35 |
| Leveling Agent | 0.89 | 0.89 | 0.89 | 0.89 | 0.89 | 0.89 | 0.89 | 0.89 | 0.89 |
| Solid Content Concentration (% by mass) | 25.50 | 25.50 | 25.50 | 25.50 | 25.50 | 25.50 | 25.50 | 25.50 | 25.50 |
| First Viscosity $\eta_1$ (Pa·s) | 0.3 | 0.5 | 1.2 | 1.3 | 0.2 | 0.6 | 0.3 | 1.0 | 0.7 |
| Second Viscosity $\eta_2$ (Pa·s) | 0.6 | 1.0 | 1.6 | 2.0 | 0.3 | 1.0 | 0.4 | 1.2 | 0.8 |
| $\eta_2/\eta_1$ | 2.0 | 2.0 | 1.3 | 1.5 | 1.5 | 1.7 | 1.3 | 1.2 | 1.1 |
| Filter Permeability | Excellent | Excellent | Defective | Defective | Excellent | Excellent | Excellent | Defective | Excellent |
| Suppression of Repellence | Defective | Excellent | Excellent | Excellent | Defective | Excellent | Defective | Excellent | Defective |
| Suppression of Streaks | — | Excellent | Defective | Defective | — | Excellent | — | Excellent | — |
| Drop Impact Resistance Energy (J) | — | 0.36 | 0.47 | 0.21 | — | 0.27 | — | 0.12 | — |
| Drop Impact Resistance | — | Defective | Excellent | Defective | — | Defective | — | Defective | — |

Evaluation

Each of the water-dispersed pressure-sensitive adhesive compositions of Examples 1 to 8 contained 0.1 to 2.2% by mass (ratio in the solid content) of the carboxylic acid copolymer thickener and 1.2 to 5.2% by mass (ratio in the solid content) of the polyacrylic acid thickener in addition to the water-dispersible polymer and water. Such a water-dispersed pressure-sensitive adhesive composition exhibited excellent filter permeability and suppressed repellence and streaks during coating. In addition, according to such water-dispersed pressure-sensitive adhesive composition, it was possible to form the pressure-sensitive adhesive sheet having excellent drop impact resistance.

On the other hand, the water-dispersed pressure-sensitive adhesive composition of Comparative Example 1 (the carboxylic acid copolymer thickener was not contained and the polyacrylic acid thickener ratio was 2.27% by mass) caused repellence during coating, and the pressure-sensitive adhesive sheet could not be formed. The water-dispersed pressure-sensitive adhesive composition of Comparative Example 2 (the carboxylic acid copolymer thickener ratio was 0.04% by mass and the polyacrylic acid thickener ratio was 2.26% by mass) caused repellence during coating, and the pressure-sensitive adhesive sheet could not be formed. The water-dispersed pressure-sensitive adhesive composition of Comparative Example 3 (the carboxylic acid copolymer thickener was not contained and the polyacrylic acid thickener ratio was 4.23% by mass) could not form the pressure-sensitive adhesive sheet having excellent drop impact resistance. The water-dispersed pressure-sensitive adhesive composition of Comparative Example 4 (the carboxylic acid copolymer thickener ratio was 1.77% by mass and the polyacrylic acid thickener ratio was 2.23% by mass) had poor filter permeability and caused streaks during coating. The water-dispersed pressure-sensitive adhesive composition of Comparative Example 5 (the carboxylic acid copolymer thickener ratio was 2.11% by mass and the polyacrylic acid thickener ratio was 2.22% by mass) had poor filter permeability, caused streaks during coating, and could not form the pressure-sensitive adhesive sheet having excellent drop impact resistance. The water-dispersed pressure-sensitive adhesive composition of Comparative Example 6 (the carboxylic acid copolymer thickener ratio was 0.73% by mass and the polyacrylic acid thickener ratio was 0.73% by mass) caused repellence during coating, and the pressure-sensitive adhesive sheet could not be formed. The water-dispersed pressure-sensitive adhesive composition of Comparative Example 7 (the carboxylic acid copolymer thickener ratio was 0.70% by mass and the polyacrylic acid thickener ratio was 3.86% by mass) could not form the pressure-sensitive adhesive sheet having excellent drop impact resistance. The water-dispersed pressure-sensitive adhesive composition of Comparative Example 8 (the carboxylic acid copolymer thickener ratio was 1.81% by mass and the polyacrylic acid thickener was not contained) caused repellence during coating, and the pressure-sensitive adhesive sheet could not be formed. The water-dispersed pressure-sensitive adhesive composition of Comparative Example 9 (the carboxylic acid copolymer thickener ratio was 2.86% by mass and the polyacrylic acid thickener was not contained) had poor filter permeability and the pressure-sensitive adhesive sheet having excellent drop impact resistance could not be formed. The water-dispersed pressure-sensitive adhesive composition of Comparative Example 10 (the carboxylic acid copolymer thickener ratio was 2.51% by mass and the polyacrylic acid thickener was not contained) caused repellence during coating, and the pressure-sensitive adhesive sheet could not be formed.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

DESCRIPTION OF REFERENCE NUMERALS

X Pressure-sensitive adhesive sheet
10 Pressure-sensitive adhesive layer
L1, L2 Release liner

The invention claimed is:

1. A water-dispersed pressure-sensitive adhesive composition comprising:
   a water-dispersible polymer, a carboxylic acid copolymer thickener, a polyacrylic acid thickener, and water, wherein
   a ratio of the carboxylic acid copolymer thickener in a solid content of the water-dispersed pressure-sensitive adhesive composition is 0.1% by mass or more and 0.9% by mass or less, and
   a ratio of the polyacrylic acid thickener in the solid content is 1.8% by mass or more and 3.7% by mass or less.

2. The water-dispersed pressure-sensitive adhesive composition according to claim 1, wherein a total ratio of the carboxylic acid copolymer thickener and the polyacrylic acid thickener in the solid content is 2% by mass or more and 4.2% by mass or less.

3. The water-dispersed pressure-sensitive adhesive composition according to claim 1, wherein the water-dispersed pressure-sensitive adhesive composition has a viscosity of 0.8 Pa·s or less under conditions of a shear rate of 4 $s^{-1}$ and 30° C.

4. The water-dispersed pressure-sensitive adhesive composition according to claim 1,
   wherein the water-dispersed pressure-sensitive adhesive composition has a viscosity of 0.9 Pa·s or more and 1.5 Pa·s or less under conditions of a shear rate of 4 $s^{-1}$ and 30° C. after shearing under conditions of a shear rate of $1\times10^4$ $s^{-1}$ and 30° C.

5. The water-dispersed pressure-sensitive adhesive composition according to claim 1, further comprising a tackifier.

6. The water-dispersed pressure-sensitive adhesive composition according to claim 1, further comprising a leveling agent.

7. The water-dispersed pressure-sensitive adhesive composition according to claim 2, wherein the water-dispersed pressure-sensitive adhesive composition has a viscosity of 0.8 Pa·s or less under conditions of a shear rate of 4 $s^{-1}$ and 30° C.

8. The water-dispersed pressure-sensitive adhesive composition according to claim 2,
   Wherein the water-dispersed pressure-sensitive adhesive composition has a viscosity of 0.9 Pa·s or more and 1.5 Pa·s or less under conditions of a shear rate of 4 $s^{-1}$ and 30° C. after shearing under conditions of a shear rate of $1\times10^4$ $s^{-1}$ and 30° C.

9. The water-dispersed pressure-sensitive adhesive composition according to claim 2, further comprising a tackifier.

10. The water-dispersed pressure-sensitive adhesive composition according to claim 2, further comprising a leveling agent.

11. The water-dispersed pressure-sensitive adhesive composition according to claim 3,
    wherein the water-dispersed pressure-sensitive adhesive composition has a viscosity of 0.9 Pa·s or more and 1.5 Pa·s or less under conditions of a shear rate of 4 $s^{-1}$ and 30° C. after shearing under conditions of a shear rate of $1\times10^4$ $s^{-1}$ and 30° C.

12. The water-dispersed pressure-sensitive adhesive composition according to claim 3, further comprising a tackifier.

13. The water-dispersed pressure-sensitive adhesive composition according to claim 3, further comprising a leveling agent.

14. The water-dispersed pressure-sensitive adhesive composition according to claim 7,
    wherein the water-dispersed pressure-sensitive adhesive composition has a viscosity of 0.9 Pa·s or more and 1.5 Pa·s or less under conditions of a shear rate of 4 $s^{-1}$ and 30° C. after shearing under conditions of a shear rate of $1\times10^4$ $s^{-1}$ and 30° C.

15. The water-dispersed pressure-sensitive adhesive composition according to claim 4, further comprising a tackifier.

16. The water-dispersed pressure-sensitive adhesive composition according to claim 4, further comprising a leveling agent.

17. A pressure-sensitive adhesive sheet comprising:
    a pressure-sensitive adhesive layer formed from the water-dispersed pressure-sensitive adhesive composition according to claim 1.

18. The pressure-sensitive adhesive sheet according to claim 17,
    wherein the pressure-sensitive adhesive layer has a thickness of 40 µm or less.

19. A pressure-sensitive adhesive sheet comprising:
    a pressure-sensitive adhesive layer formed from the water-dispersed pressure-sensitive adhesive composition according to claim 2.

20. The pressure-sensitive adhesive sheet according to claim 19,
    wherein the pressure-sensitive adhesive layer has a thickness of 40 µm or less.

* * * * *